(12) United States Patent
Bak et al.

(10) Patent No.: US 8,826,222 B2
(45) Date of Patent: Sep. 2, 2014

(54) PRE-MERGE CONFLICT AVOIDANCE

(75) Inventors: Nathan V Bak, Portland, OR (US);
Avantika R Mathur, Irvine, CA (US);
Eric B Munson, Hillsboro, OR (US);
Ramanchandra N Pai, Beaverton, OR (US); Timothy C Pepper, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 13/196,728

(22) Filed: Aug. 2, 2011

(65) Prior Publication Data

US 2013/0036400 A1 Feb. 7, 2013

(51) Int. Cl.
*G06F 9/44* (2006.01)
*G06F 9/45* (2006.01)
*G06Q 10/06* (2012.01)

(52) U.S. Cl.
CPC *G06Q 10/06* (2013.01); *G06F 8/20* (2013.01); *G06F 8/71* (2013.01); *G06F 8/10* (2013.01)
USPC ............ 717/101; 717/110; 717/122; 717/136

(58) Field of Classification Search
CPC .............. G06Q 10/06; G06F 8/20; G06F 8/71
See application file for complete search history.

(56) References Cited

U.S. PATENT DOCUMENTS

| | | | |
|---|---|---|---|
| 7,131,112 B1 | 10/2006 | Bartz et al. | |
| 7,266,805 B2 * | 9/2007 | Weidman et al. | 717/101 |
| 7,539,943 B2 | 5/2009 | Vaidyanathan et al. | |
| 8,219,971 B2 * | 7/2012 | Cao et al. | 717/110 |
| 8,387,014 B2 * | 2/2013 | Plante | 717/122 |
| 8,453,112 B1 * | 5/2013 | Brambley et al. | 717/110 |
| 2002/0144239 A1 * | 10/2002 | Bentley | 717/136 |
| 2005/0044530 A1 * | 2/2005 | Novik | 717/122 |
| 2005/0262485 A1 * | 11/2005 | Plante | 717/136 |
| 2008/0046858 A1 | 2/2008 | McClean et al. | |
| 2008/0086718 A1 | 4/2008 | Bostick et al. | |
| 2008/0189681 A1 | 8/2008 | Bhogal et al. | |
| 2008/0229282 A1 | 9/2008 | deVries et al. | |
| 2008/0229290 A1 * | 9/2008 | Jones et al. | 717/137 |

(Continued)

OTHER PUBLICATIONS

Yasuhiro Hayase, Revision Control System Using Delta Script of Syntax Tree, 2005, pp. 133-147.*

Freddie Albertsman, Merging and Renaming in Revision Control Software, 2008, pp. 3-9 and 17-24.*

(Continued)

*Primary Examiner* — Thuy Dao
*Assistant Examiner* — Mongbao Nguyen
(74) *Attorney, Agent, or Firm* — Marcia L. Doubet (57) ABSTRACT

Methods, systems, and computer program products may provide pre-merge conflict avoidance in a revision-control system. A pre-merge conflict avoidance method may include identifying by a computer system a portion of interest of a revision-controlled base source code stored in a source-code repository, the base source code being developed by a plurality of developers. The computer system may determine whether at least one of the plurality of developers has made a change to a portion of a first copy of the base source code corresponding to the portion of interest prior to commitment of the first copy of the base source code to the source-code repository. In response to a determination that the at least one developer has made a change to the portion of interest, a notification may be produced about the change to the portion of interest by the at least one developer.

15 Claims, 5 Drawing Sheets

(56) References Cited

U.S. PATENT DOCUMENTS

| | | | |
|---|---|---|---|
| 2008/0244522 A1* | 10/2008 | Bernin | 717/122 |
| 2008/0301639 A1 | 12/2008 | Bell et al. | |
| 2009/0094572 A1* | 4/2009 | Hegde et al. | 717/101 |
| 2009/0106731 A1* | 4/2009 | Coulthard et al. | 717/101 |
| 2009/0119576 A1 | 5/2009 | Pepper et al. | |
| 2009/0210852 A1* | 8/2009 | Martineau | 717/101 |
| 2009/0210855 A1 | 8/2009 | Ramanathan | |
| 2009/0259989 A1* | 10/2009 | Cifuentes et al. | 717/110 |
| 2009/0276757 A1 | 11/2009 | Lindvall et al. | |
| 2010/0122234 A1* | 5/2010 | Le Bars et al. | 717/106 |
| 2012/0159434 A1* | 6/2012 | Dang et al. | 717/120 |
| 2013/0247016 A1* | 9/2013 | Sharma et al. | 717/136 |

OTHER PUBLICATIONS

O'Reilly, Version Control with Git, 2009, pp. 17-28, 87-101 and 119-146.*

Omoronyia et al., Use Case to Source Code Traceability: The Developer Navigation View Point, 17th IEEE International Conference Aug. 31-Sep. 4, 2009, 6 pages.

Godfrey et al., Using Origin Analysis to Detect Merging and Splitting of Source Code Entities, IEEE Transactions, vol. 31, Iss. 2, Feb. 2005, 16 pages.

IBM et al., A Method and Apparatus for Merging Source Code by Instance Message, IPCOM000197580D, Jul. 15, 2010, 4 pages.

IBM et al., Enhanced Source Code Notifications, IPCOM000177989D, Jan. 12, 2009, 2 pages.

* cited by examiner

PRE-MERGE CONFLICT AVOIDANCE

BACKGROUND

The present inventions relate to software development systems, and more specifically, to revision-control systems for development systems that provide conflict avoidance.

During a software development project, a team of developers may work on source code, documentation, and/or graphics, stored in various files. Each developer may potentially change any file, and a change to any file may potentially trigger a need to change one or more other files. Each developer must remain alert to changes implemented by other developers that might impact his or her work, so that the developer can if necessary make compatible changes or coordinate compatible changes with the other developers. To manage change during development, a development project may rely on a revision-control system (RCS). An RCS may provide features for storing files in a source-code repository, for designating one or more versions of the project, for allowing a developer to check out copies of files, and for allowing the developer to check the copies back into the repository. An RCS may provide features for merging differing copies back into the repository. The merging process may reveal conflicts that must be resolved before the revised product can be built. For example, changes implemented by one developer may conflict with changes implemented by another developer working on the same file or on a different file.

BRIEF SUMMARY

According to one embodiment, a method for pre-merge conflict avoidance may include identifying by a computer system a portion of interest of a revision-controlled base source code stored in a source-code repository, the base source code being developed by a plurality of developers; determining by the computer system whether at least one of the developers has made a change to a portion of a first copy of the base source code corresponding to the portion of interest prior to commitment of the first copy of the base source code to the source-code repository; and in response to a determination that the developer has made a change to the portion of interest, producing a notification about the change to the portion of interest by the developer. Identifying a portion of interest may further include monitoring a second copy of the base source code being developed by at least one other developer; identifying a portion of the second copy that is changed by the other developer; and designating as the portion of interest the portion of the base source code corresponding to the changed portion of the second copy.

In another embodiment, identifying a portion of interest may include monitoring each copy of the base source code to identify each portion of each copy that is changed by each developer of the plurality of developers prior to commitment of the respective copy to the source-code repository; and designating each portion of the base source code corresponding to each portion of each copy that is changed as a respective portion of interest of the base source code.

In yet another embodiment, determining whether at least one of the developers has made a change to a portion of a first copy of the base source code may include determining whether the determined portions of interest of the base source code include common portions of the base source code; and wherein producing a notification about the change to the portion of interest may include producing a respective notification for each developer that has made a change to a respective common portion of the base source code.

In yet another embodiment, identifying a portion of interest of the base source code may include receiving an indication of the portion of interest of the base source code.

In yet another embodiment, determining whether at least one of the developers has made a change to the portion of interest of at least a first copy of the base source code may include monitoring a source of information generated in response to changes to respective copies of the base source code made by the at least one other developer, and determining whether the generated information indicates that changes have been made to the portion of interest of the base source code.

Any of the above embodiments may be embodied as computer-based methods, systems, or program products.

DETAILED DESCRIPTION

As will be appreciated by one skilled in the art, aspects of the present inventions may be embodied as a system, method or computer program product. Accordingly, aspects of the present inventions may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventions may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventions may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present inventions are described below with reference to flowchart illustrations and/or block diagrams of methods, apparatus (systems) and computer program products according to embodiments of the inventions. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

Figure 1:
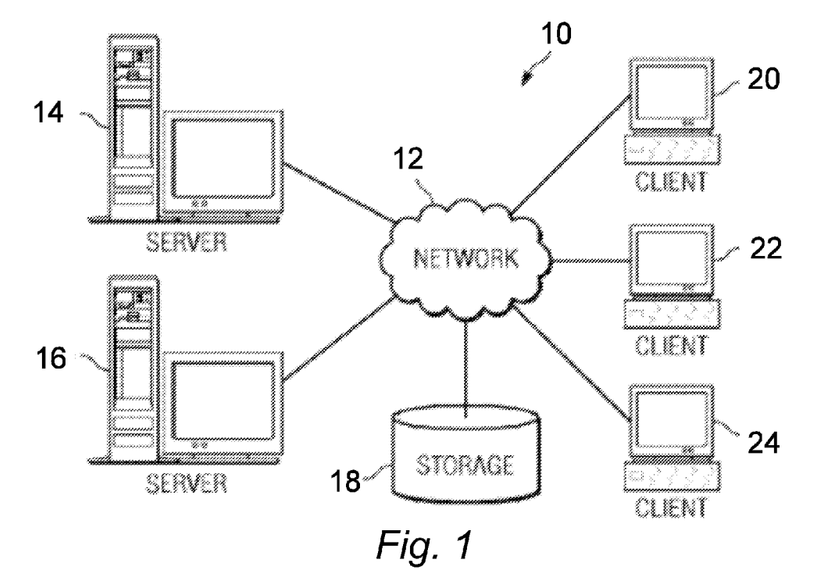
FIG. 1 is a pictorial representation of an example of a computer system in which illustrative embodiments may be implemented.
Figure 2:
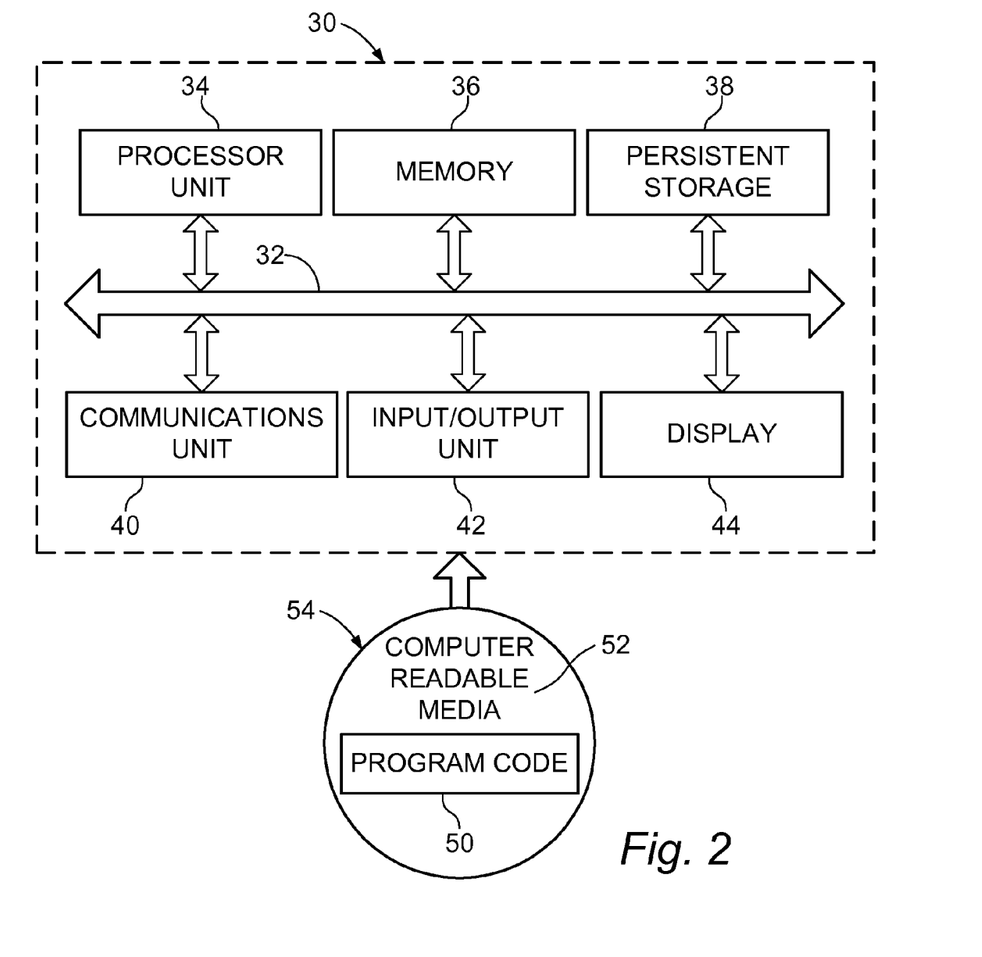
FIG. 2 is a block diagram of an example of a computer in which illustrative embodiments may be implemented.

With reference now to the figures and in particular to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

The flowcharts and block diagrams in the figures illustrate the architecture, functionality, and operation of possible implementations of systems, methods and computer program products according to various embodiments of the present inventions. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 1 depicts a computer system, indicated generally at 10, and including a network of computers in which illustrative embodiments may be implemented. Computer system 10 may contain a network 12, which is the medium used to provide communications links between various devices and computers connected together within computer system 10. Network 12 may include connections, such as wire, wireless communication links, or fiber optic cables, or combinations of such connections.

In the depicted example, a server 14 and a server 16 may connect to network 12 along with a storage unit 18. In addition, one or more client computers may connect to network 12, such as a first client computer 20, a second client computer 22, and a third client computer 24. Client computers 20, 22, and 24 may be, for example, personal computers work stations, or network computers. In the depicted example, server 14 may provide data, such as boot files, operating system images, and/or software applications to client computers 20, 22, and 24. Client computers 20, 22, and 24 are clients to server 14 in this example. Computer system 10 may include additional servers, clients, and other devices not shown, or may include fewer devices than those shown.

In the depicted example, network 12 may be or may include the Internet. Computer system 10 also may be implemented with a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of an exemplary data processing system 30 is shown in which illustrative embodiments may be implemented. Data processing system 30 is an example of a computer, such as server 14 or client computer 20 in FIG. 1, in which computer-usable program code or instructions implementing the processes may be located for the illustrative embodiments. In this illustrative example, data processing system 30 may include communications fabric 32, which provides communications between a processor unit 34, a memory 36, a persistent storage 38, a communications unit 40, an input/output (I/O) unit 42, and a display 44. In other examples, a data processing system may include more or fewer devices.

Processor unit 34, also referred to simply as a processor, may serve to execute instructions for software that may be loaded into memory 36 from persistent storage 38. Processor unit 34 may be a set of one or more processors or may be a multi-processor core, depending on the particular implementation. Further, processor unit 34 may be implemented using one or more heterogeneous processor systems in which a main processor is present with secondary processors on a single chip. As another illustrative example, processor unit 34 may be a symmetric multi-processor system containing multiple processors of the same type.

Memory 36 and persistent storage 38 are examples of storage devices. A storage device is any piece of hardware that is capable of storing information either on a temporary basis and/or a permanent basis. Memory 36, in these examples, may be, for example, a random access memory or any other suitable volatile or non-volatile storage device. Persistent storage 38 may take various forms depending on the particular implementation. For example, persistent storage 38 may contain one or more components or devices. For example, persistent storage 38 may be a hard drive, a flash memory, a rewritable optical disk, a rewritable magnetic tape, or some combination of the above. The media used by persistent storage 38 also may be removable. For example, a removable hard drive may be used for persistent storage 38.

Communications unit 40, in these examples, provides for communications with other data processing systems or devices. For example, communications unit 40 may be a network interface card. Communications unit 40 may provide communications through the use of either or both physical and wireless communications links.

Input/output unit 42 allows for input and output of data with other devices that may be connected to data processing system 30. For example, input/output unit 42 may provide a connection for user input through a keyboard and mouse. Further, input/output unit 42 may send output to a printer. Display 44 displays information to a user.

Instructions for the operating system and applications or programs are located on persistent storage 38. These instructions may be loaded into memory 36 for execution by processor unit 34. The processes of the different embodiments may be performed by processor unit 34 using computer implemented instructions, which may be located in a memory, such as memory 36. These instructions are referred to as program code, computer-usable program code, or computer-readable program code that may be read and executed by a processor in processor unit 34. The program code in the different embodiments may be embodied on different physical or tangible computer-readable media, such as memory 36 or persistent storage 38.

Program code 50 may be located in a functional form on a computer-readable media 52 that is resident on a local or remote storage device or is selectively removable and may be loaded onto or transferred to data processing system 30 for execution by processor unit 34. Program code 50 and computer-readable media 52 form computer program product 54 in these examples. In one example, computer-readable media 52 may be in a tangible form, such as, for example, an optical or magnetic disc that is inserted or placed into a drive or other device that is part of persistent storage 38 for transfer onto a storage device, such as a hard drive that is part of persistent storage 38. In a tangible form, computer-readable media 52 also may take the form of a persistent storage, such as a hard drive, a thumb drive, or a flash memory that is connected to data processing system 30. The tangible form of computer-readable media 52 is also referred to as computer-recordable storage media. In some instances, computer-recordable media 52 may not be removable.

Alternatively, program code 50 may be transferred to data processing system 30 from computer-readable media 52 through a communications link to communications unit 40 and/or through a connection to input/output unit 42. The communications link and/or the connection may be physical or wireless, or a combination of physical and wireless in the illustrative examples. The computer-readable media also may take the form of non-tangible media, such as communications links or wireless transmissions containing the program code.

The different components illustrated for data processing system 30 are not meant to provide architectural limitations to the manner in which different embodiments may be implemented. The different illustrative embodiments may be implemented in a data processing system including components in addition to or in place of those illustrated for data processing system 30. Other components shown in FIG. 2 can be varied from the illustrative examples shown. As one example, a storage device in data processing system 30 is any hardware apparatus that may store data. Memory 36, persistent storage 38, and computer-readable media 52 are examples of storage devices in tangible forms.

In another example, a bus system may be used to implement communications fabric 32 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 36 or a cache such as found in an interface and memory controller hub that maybe present in communications fabric 32.

Figure 3:
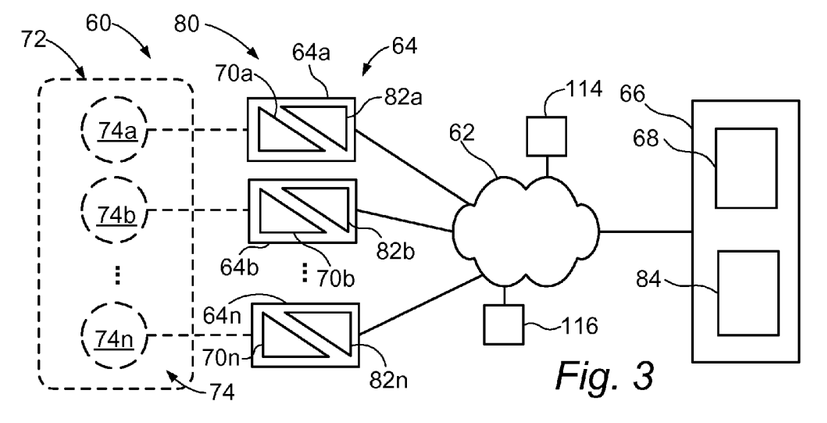
FIG. 3 shows an example of a development environment in which illustrative embodiments may be implemented.

With reference also to FIG. 3, a development environment, indicated generally at 60, is an example of a computer system 10 in which illustrative embodiments may be implemented. Development environment 60 offers features and capabilities for producing a product, such as a computer program, website, or publication. Environment 60 may include a communications network 62, which may be an example of network 12; one or more developer's workstations 64a-64n, which may be examples of a client 20, 22, 24; and at least one server 66, which may be an example of a server 14, 16 and which may host or have access to storage 68. Each workstation 64a-64n may run or have access to a set of developer's tools 70a-70n selected for the task at hand. For example, to develop products delivered as object files, tools 70a-70n may include one or more text editors, compilers, assemblers, interpreters, and/or debuggers; to develop websites, tools 70a-70n may include HTML, CSS, graphics, and/or script editors and validators; or to develop internal or published documentation, tools may include word processors, graphics editors, and/or page-layout software. Other development tasks, other tools, and other combinations of tools will be apparent to those skilled in the art.

Development projects may be collaborative efforts involving a plurality of developers 74, hereinafter called a team 72, that includes at least one developer 74a operating at least one workstation 64a and one or more other developers 74b-74n of a plurality of developers 74, each of the other developers 74a-74n operating one or more other workstations 64, such as workstations 64b-64n. Members of team 72 may be in close proximity or widely distributed and may be considered a team by the fact that they are developing the same source code. Members of team 72 may have access to email 114, discussion forums 116, and other sources of project-related information, for example via network 62.

Environment 60 may further include a revision control system (RCS), indicated generally at 80. RCS 80 may include client-side components 82a-82n that run on workstations 64a-64n and server-side components 84 that run on servers 66. These components may communicate when appropriate via communications network 62. It is understood that FIG. 3 is intended as an illustrative example, and not as an architectural limitation. Environment 60 may include other workstations, servers, and devices not shown; or it may include fewer devices than those shown.

Figure 4:
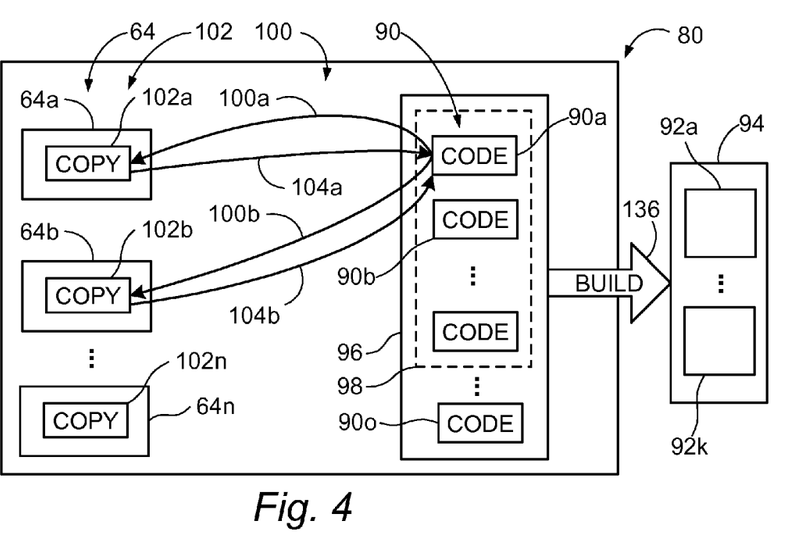
FIG. 4 shows an example of a revision control system in accordance with principles of the present inventions.

Referring now also to FIG. 4, RCS 80 is an example of a portion of development environment 60 in which illustrative embodiments may be implemented. RCS 80 may provide features for tracking, managing, and/or implementing changes to source-code files 90 and for generating (or building) one or more versions 92a-92k of a product 94. Each version 92a-92k of product 94 may be an update to a previous product release (for example, to correct errors) or an upgrade offered as a new product release (for example, to add new features). RCS 80 provides the ability to assign a unique identifier, which may be called a version number, to designate a variant of product 94, for example, to define a distinguishable revision or configuration of product 94. It is understood that the "a-n" and similar notation used herein to indicate an indefinite range does not necessarily imply any direct correspondence between items designated by the same letter; or that each range has the same number of items; or that the designated items are in any ordinal sequence. For example, version 92a does not necessarily correspond to developer 74a, who might or might not be among the developers working on version 74a; and the total number of developers may differ from the total number of versions.

Source-code repository 96 may be a storehouse for source code, which may be stored in one or more source-code files 90a-90o, also referred to a source code. Files 90a-90o may contain program instructions, ASCII text, binary data, image data, formatted documents, or any other type of information. With reference to FIG. 3, repository 96 may be implemented via a server 66 in communication with storage 68 for example via network 62. Other functional combinations will be apparent to those skilled in the art.

To provide the ability to build or rebuild one or more versions 92a-92k of product 94, RCS 80 may maintain a code base 98, which may be a set of source-code files 90a-90o in source-code repository 96 managed by RCS 80 to build product 94. Repository 96 may store more than one code base 98, and a source file 90 in repository 96 may belong to more than one code base 98. RCS 80 may maintain a record of changes to the content of each source file 90 in repository 96, where the changes to content may be stored as differences or deltas between versions. Source code 90a-90o in a code base 98 managed by RCS 80 may be referred to as revision-controlled base source code.

Figure 5:
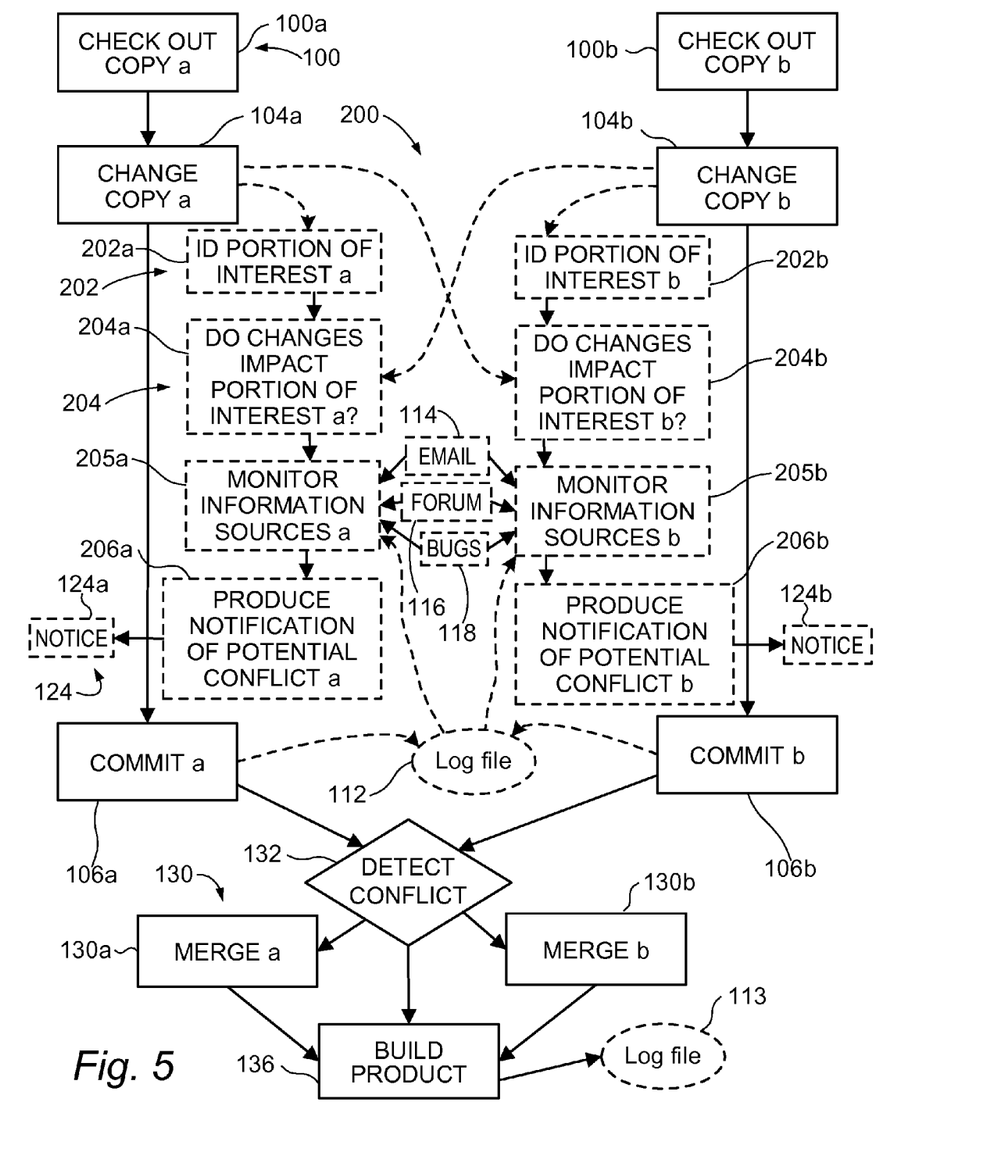
FIG. 5. shows a flow-chart illustrating an example of the use of a revision control system in accordance with the principles of the present inventions.

RCS 80 may maintain one or more log files 112, shown in FIG. 5, that list and describe each change to the base source code. A log file 112 may detail each change by file name and line number, for example, the log file 112 thereby being an example of a source of information indicative of changes being made to the base source code by the team or plurality of developers. For example, if a developer 74 checks in a revised version of a source-code file 90 that contains an inserted line of code, then RCS 80 may write data to one or more log files 112, such as a commit log file, to document the insertion.

RCS 80 further may provide capabilities for building or rebuilding any designated version of product 94. For example, to build a specified version of product 94, RCS 80 may generate from code base 98 a set of source-code files synchronized to the specified version. If appropriate, RCS 80 may directly or indirectly compile or otherwise assemble one or more executable programs for inclusion in the specified version. By storing a code base 98, version-specific records of changes to the content of source code, and log files 112 documenting the changes, and by building any designated version of product 94, RCS 80 provides capabilities that enable a developer or a team of developers to work concurrently on multiple versions of product 94.

A main development stem of code base 98, perhaps dedicated to a future upgrade release of product 94, may be referred to as a trunk. A fork of code base 98, perhaps corresponding to a previously released version, may be referred to as a branch. RCS 80 may provide the ability to apply specified changes to specified numbered versions. For example, changes that add new functionality may be limited to the trunk, while changes that correct errors may propagate to one or more specified branches, for example, to support an eventual updated revision.

Referring now also to FIG. 5, features of RCS 80 may allow a developer 74 to designate a version number and check out a working copy 102 of all or part of code base 98, thereby obtaining a private copy of all or part of the designated revision-controlled base source code synchronized to that version number. During a check-out operation, indicated at 100a and 100b, RCS 80 may create a working copy 102a or 102b of each file 90 that has been checked out and provide access by respective developer 74 to copy 102. Copy 102 may reside on workstation 64 used by developer 74 but may reside elsewhere, for example, on a server maintained for RCS 80 and in communication with workstation 64. Access to working copy 102 provides developer 74 with the ability to make changes to his or her working copy, as indicated at 104a and 104b. A developer may build a private variation of all or part of changed product 94, for example, to implement changes to the product.

Features of RCS 80 may allow the developer to check one or more changed files in a working copy back into repository 96, for example, to propagate changes made to a portion of the source code into one or more numbered versions of product 94. The check-in operation publishes changes from a working copy into the base source code 98, also called the code base, which is the official or canonical version of the code under development by the team. This publication commits at 106a or 106b the changes to the shared base source code, so this operation may be referred to as a commitment operation 106. During a check-in (commitment) operation 106, RCS 80 may perform a merge operation 130a or 130b to propagate changes from the working copy into one or more specified trunks or branches, for example, by means of a file-comparison operation that yields a list of differences between the working copy and the base source code, so that the differences may be stored as a record of the change. When RCS 80 generates or builds at 136 a specified version of product 94, RCS 80 may incorporate all changes accumulated in the specified branch.

For example, if a bug has been reported in a version of product 94, the developer may use RCS 80 to check out the relevant portion of the base source code 98 synchronized to that version, fix the bug, and check the fixed source code 98 back into repository 96, so that RCS 80 can rebuild a revision of the version that includes the correction. If the bug exists in other versions, features of RCS 80 may enable specifying other numbered versions to benefit from the same change.

If development environment 60 has a client-server architecture, portions of RCS 80 may run or reside on one or more servers, and portions may run or reside on one or more client workstations 64. Those skilled in the art will understand that networked environments can express similar functionality thorough diverse architectural designs.

During a commitment operation 106, RCS 80 may generate one or more log files 112 that document the commitment operation 106, merge operation 130, or both. For example, when checking in a file and committing changes to repository 96, a developer may write comments describing the change, and RCS 80 may save data such as a developer ID, comments, a time stamp, and/or other details in the form of a commit log file 112, which may accumulate entries spanning a series of check-in (commitment) operations 106. In another example, RCS 80 may save computer-generated data such as a list of differences between revisions to a log file 113, such as a patch log file. Log files 112 and 113 may serve as references or information sources for locating or understanding particular changes.

If only one developer at a time changes a given file 90, RCS 80 may conduct a straightforward merge operation 130 to detect differences between the checked-in copy and the base source code and propagate those differences into one or more designated branches. RCS 80 may offer an option during a check-out operation 100 to lock one or more files being checked out. RCS 80 places a locked file under the exclusive control of the developer who locked it. When checking in a locked file, the developer can release the lock, allowing other developers to check out and edit the file.

Developers may be able to disregard locks held by other developers and to edit independent working copies of source files. For example, a first developer 74a may check out, lock at 100a, and edit at 104a working copy 102a of source file 90a. A second developer 74b may check out at 100b the same file, accidentally or intentionally disregard the lock, and edit at 104b an independent working copy 102b of source file 90a. In this situation, the locked working copy 102a and the independent working copy 102b differ in different ways from source file 90a. If both developers propagate changes into the base source code, then RCS 80 may accommodate the differences between locked copy 102a and the independent copy 102b. For the first working copy to be checked in, merge operation 130a checks for conflicts as indicated at 132, finds no conflicts, and performs a straightforward update to the base source code file 90a in repository 96.

For the second working copy to be checked in, a conflict detection operation 132 and merge operation 130b consider the second set of changes relative both to the original base source code and to the changes applied by the first merge operation 130a. If two sets of changes are in functionally distinct regions of the same file 90a, merge operation 130b may be able to resolve the conflict automatically. If two sets of changes are in the same or functionally related regions, the conflict-detection operation 132 may be able to detect a merge conflict but unable to resolve it. Often a developer inspects the conflicting working copies, combines changes, elects one change over another change, or otherwise reasons out a solution. Manual resolution of merge conflicts may consume large amounts of developer time and may reveal wasted effort, for example, by exposing redundant or incompatible changes. If there are more than two working copies, each with independent changes, the resolution process becomes more complex. An unresolved merge conflict may prevent RCS 80 from building the impacted version of the product 94.

It may be desirable to allow two or more developers to work on the same file at the same time. This strategy allows multiple developers to work concurrently on the same source code, which is potentially more efficient than enforcing exclusive control. This strategy elevates the risk of merge conflicts, especially for large projects or distributed teams. In a development environment that permits concurrent work, resolution of merge conflicts may interfere with other productive work.

Figure 6:
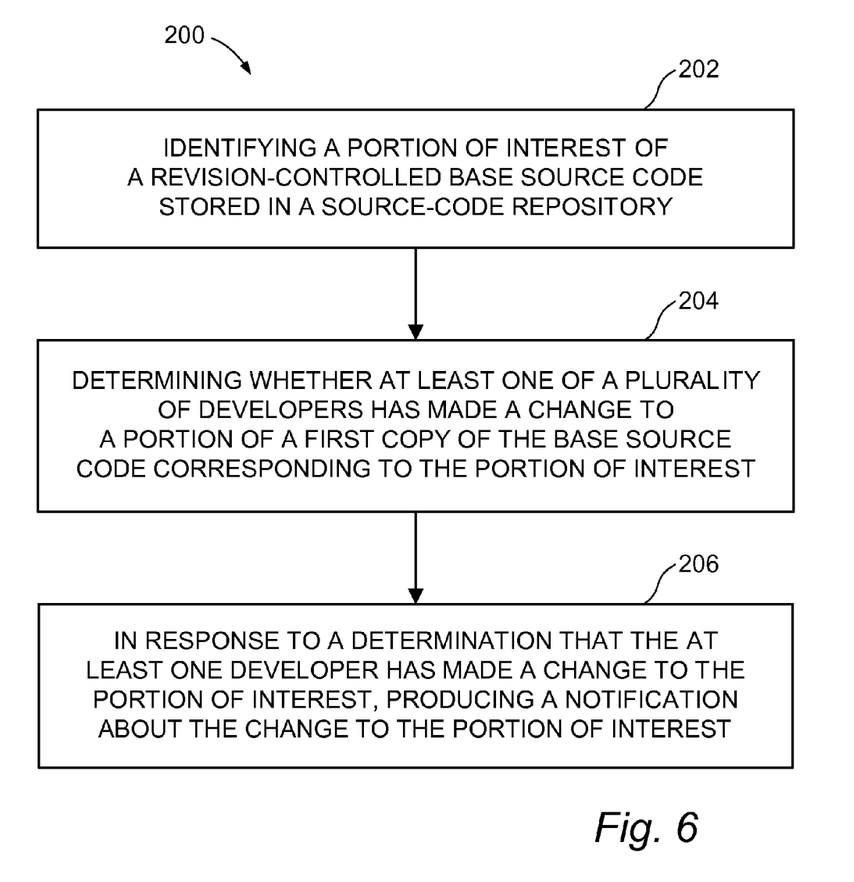
FIG. 6 shows an example of a method of pre-merge conflict avoidance in accordance with the principles of the present inventions.

Referring now also to FIG. 6, RCS 80 may provide mechanisms 200 for avoiding merge conflicts between different copies of the same portion of the base source code by detecting merge conflicts prior to the merge operation 130. To do so, RCS 80 may, as indicated at 202a and 202b, identify a portion of interest of revision-controlled base source code 98 stored in repository 96 and under development by team 72 of developers 74a-74n. As indicated at 204a and 204b, RCS 80 may determine whether a developer who has checked out a copy 102 of the base source code has made a change to his or her copy within a portion of the copy corresponding to the portion of interest of the base source code. This determination 204 may occur before the developer checks the changed copy back into the repository at 106a and 106b, thereby committing the change into the base source code. In response to the determination, RCS 80 may produce a notification about the change, as indicated at 206 One or more developers may rely on this notification 124a or 124b of pending change, for example, to maintain the compatibility of their changes with changes being made by other developers. RCS 80 may send notice 124 to the associated developers before that developer commits changes in his or her working copy into the base source code in the repository.

A portion of interest of revision-controlled base source code 90 may be any part of the base source code 98. For example, the portion of interest may be one or more lines of code within one or more source files 90a-90o, an entire file 90, a directory containing one or more files, all of the source code in a designated version, or any combination of lines or files. A portion of interest may be a portion of the base source code being developed by one or more developers; or a portion of interest may be a portion of the base source code that might or might not be under active development that is designated as being of interest by an appropriate person, such as developer or administrator. RCS 80 may identify multiple portions of interest, for example, that may result in changes being made by two or more developers that will (when committed) modify the same portion of the base source code. By detecting common, overlapping changes among multiple developers, and by generating notifications 124 (also referred to as notices) about potentially conflicting edits to working copies, RCS 80 may provide developers with an early warning system that allows them to avoid or mitigate in advance the manual resolution of conflicts that would otherwise occur during merge operation 130.

A combination of embodiments may yield an illustrative implementation of RCS 80. For example, a first developer 74a, by simply checking out at 100a a file 90a from repository 96, may trigger an automatic notice 124 of conflicts potentially impacting file 90a, the notice 124 being issued by RCS 80 whenever another developer 74b-74n checks in a change that modifies the base source code for file 90a. By issuing such notices before developer 74a checks in his or her working copy 102a of file 90a, developer 74a has an early opportunity to anticipate changes being implemented by other developers 74*b*-74*n*, and to modify his or her working copy 102*a* of file 90*a*, for example, to avoid conflicts that would otherwise arise during the merge operation 130.

In some embodiments, RCS 80 may automatically identify a portion of interest, for example, by extending the check-out operation 100 to include an identification capability. As mentioned elsewhere, the check-out operation may allow a developer to designate a version and obtain a working copy of all or part of the base source code synchronized to that version. In some embodiments, during a check-out operation 100, RCS 80 may additionally register an association between developer 74 and the portion of the source code being checked out by developer 74. RCS 80 may perform this registration by default and may identify all or part of the checked-out source code as a portion of interest. Such embodiments implement the premise that code that has been checked out by a developer is a presumptive portion of interest to that developer 74.

In some embodiments, identifying a portion of interest may include monitoring a second copy of the base source code checked out by another developer 74*b*, as a source of information, to detect a portion of the second copy that has been changed by the other developer, and designating as a portion of interest the portion of the base source code corresponding to the changed portion of the second copy. For example, a first developer 74*a* may select a file 90*a* in the base source code and check out a working copy 102*a*. RCS 80 may then identify a first portion of interest within the base source code based on changes made by developer 74*a* within working copy 102*a*. A second developer 74*b* may also check out file 90*a* as a second working copy 102*b*, and RCS 80 may identify a second portion of interest within the base source code based on changes being made by developer 74*b* within working copy 102*b*. Developer 74*a* may change copy 102*a*, while developer 74*b* may concurrently change copy 102*b*. RCS 80 may determine that developer 74*a* has made an uncommitted change to working copy 102*a*.

By monitoring the second portion of interest, RCS 80 may detect an uncommitted change to the second portion of interest that potentially conflicts with the uncommitted change to first working copy 102*a*. RCS 80 may then produce a notification 124 about the potential conflict and may direct the notice to (for example) developer 74*a*, developer 74*b*, or both. It is understood that that the "first" and "second" designations with respect to developers, files, and similar items are identifying labels that do not necessarily imply sequence. In this embodiment, RCS 80 identifies two portions of interest and may treat the portions of interest separately for the purposes of determining change, evaluating potential conflicts, and producing one or more notifications.

The determination that triggers the notice may be the detection of changes to copies 102*a* and 102*b* that (if checked in) would modify the same line of the same file in the base source code. In some embodiments, RCS 80 may allow developers 74*a* or 74*b* to specify determinations that depend on criteria in addition to, or other than, a literal match of line numbers in file 90*a* in the base source code. For example, the criteria might enable detecting changes within a range of line numbers bracketing a single line being changed (that is, RCS 80 performs a proximity match within a predetermined or specified range of lines). In another example, RCS 80 may provide a mechanism for detecting changes based on functional features of the program code, such as but not limited to definitions of functions, data structures, variables, subsystems, and other constructs supported by the language in use.

In some embodiments, identifying a portion of interest may include monitoring information sources, as at steps 205*a* and 205*b*, such as by monitoring each working copy of the base source code to identify each portion of each working copy that is changed by its respective developer prior to the commitment of each working copy by its respective developer, and designating each changed portion as a portion of interest. In this embodiment, RCS 80 may identify multiple portions of interest, each portion of interest corresponding to an aspect of the development effort being performed by one or more developers. For example, if three developers check out distinct working copies of the same file from the base source code, then RCS 80 may identify a distinct portion of interest corresponding to each working copy. When RCS 80 determines that at least one of the three developers has made a change to his or her working copy, RCS 80 may monitor the other working copies, for example, to detect intersecting changes that would (when committed) impact the same portion of the base source code. RCS 80 may produce a notice 124 of the potential merge conflict and direct the notice to one or more of the three developers. Continuing the example, if all three developers happened to edit the same line of code (that is, the same line when mapped to the base source code) and none have committed the respective change, then RCS 80 may issue a notice 124 to all three developers. After one of the developers has committed the change, RCS 80 deletes the corresponding portion of interest and subsequently tracks the two remaining portions of interest. Those skilled in the art will appreciate that the number of portions of interest active at any one time may vary dynamically according to the level of activity in the project.

To monitor multiple working copies 102*a*-102*n* prior to check in, RCS 80 may maintain a means of access to copies 102*a*-102*n* checked out by one or more developers 74*a*-74*n*. In an embodiment, RCS 80 may maintain some or all copies 102*a*-102*n* in a shared file system, so that RCS 80 has ongoing access to work-in-progress changes by the respective developers 74*a*-74*n*. For example, copies 102*a*-102*n* may generally reside on a server accessible by RCS 80, and each developer 74*a*-74*n* may remotely view and change his or her copies 102*a*-102*n*. One or more workstation 64*a*-64*n* may be thin clients used for access to RCS 80. In an embodiment, some or all copies 102*a*-102*n* may reside elsewhere, for example, as files distributed to workstations 64*a*-64*n* acting as client computers. RCS 80 accordingly may communicate with one or more workstations 64*a*-64*n*, in order to monitor local change being applied to working copies 102*a*-102*n*. RCS 80 may hold rights or permissions that grant it access to working copies 102*a*-102*n*. For example, RCS 80 may hold rights or permission to a portion of a file system used by workstation 74*a* as a work space to store copies 102*a*-102*n*. In these or other embodiments, RCS 80 may monitor copies 102*a*-22*n* constantly, at a specified or predetermined time interval, or at a specified or predetermined event. The time interval between keyboarding potentially conflicting changes and sending a notification 124 to one or more developers may be virtually instantaneous, near real-time, delayed, predetermined, or controlled by a feature of RCS 80. Those skilled in the art will appreciate that other architectural embodiments may offer functionality equivalent to these representative architectural embodiments.

Each developer may potentially work on more than one development task at the same time in the same project. For example, a developer might be implementing changes in one subsystem while also implementing unrelated changes in a different subsystem. The two tasks are separate assignments performed by the same person. In an embodiment, RCS 80 may provide a capability to allow a developer to designate multiple tasks, multiple roles, or both, so that RCS 80 can identify distinct task-specific or role-specific portions of interest. A task or role may move from one developer to another. RCS 80 may accordingly provide a capability for transferring tasks or roles from one developer to another, for example, to improve continuity after changes in staffing. References to a single developer do not necessarily imply a single person in that functional role. Those skilled in the art will appreciate that development efforts are collaborative efforts. A particular task may be performed by a single developer or by a group of developers—that is, by a subset of the team. The number of developers for a given task may change over time. In some embodiments, RCS 80 may provide capabilities for mapping an identified portion of interest to more than one developer, for example, to facilitate collaboration by directing pre-merge conflict notifications to multiple interested persons. It is further understood that the term "developer" as used herein may include persons who do not change source code. Managers and documentation writers, for example, might not change the base source code, but might nonetheless benefit from receiving notification of potential conflicts.

In embodiments, identifying a portion of interest may include receiving an indication of the portion of interest. As discussed above, receiving an indication may include monitoring sources of information, such as one or more copies of the base source code and identifying in the copies an indication of the portion of interest entered by the respective developers. RCS 80 accordingly may provide capabilities that permit a developer to expressly specify a portion of interest such as a line or lines of code, a file, combination of files, directory, combination of directories, branch, or trunk, alone or in any combination. A file not part of the source code may be established for storing indications of portions of interest by one or more of the developers. Receiving an indication may accordingly include monitoring the given file associated with a given copy of the base source code and identifying in the given file an indication of the portion of interest of the base source code entered by the at least one developer.

For example, if a developer plans to work on a given source file, RCS 80 may provide a feature to allow the developer to designate that file as a portion of interest, optionally without checking out the file, for example, to receive notifications of pending changes that might affect that portion of the base source code. These mechanisms may allow the developer to elect to monitor any arbitrary source code controlled by RCS 80, instead of or in addition to code checked out by developer 74.

In embodiments, RCS 80 may provide features that allow a developer to mark one or more lines or regions of source code as a portion of interest. For example, RCS 80 may provide a mechanism for specifying a portion of interest by internally marking a file 90*a* with predefined symbols or sequences of characters. This internal markup, referred to as metadata artifacts, may have a syntax to allow a developer 74 to control the behavior of RCS 80. For example, developer 74 may wish to delimit a specific portion of file 90*a* as a portion of interest 50. RCS 80 accordingly may provide an ability to edit or insert metadata artifacts within file 90*a*, for example, to mark the starting and ending lines of that region of file 90 as portion of interest. A developer may insert artifacts by directly editing the artifacts into the source code, for example, with a text editor. RCS 80 may interpret the markup as an instruction to monitor changes within the defined range of lines. Other metadata artifacts may control monitoring and notification by RCS 80, for example, to control the content of any notification triggered from the marked region. To prevent tools such as compilers from generating errors from unexpected characters in source file 90*a*, a syntax for metadata artifacts may require delimiting metadata artifacts with comment characters selected for the computer language used within file 90*a*.

Those skilled in the art will appreciate that a syntax used for metadata artifacts may be extended to include instructions applicable to any operation of RCS 80. For example, in an embodiment, metadata artifacts may allow identification of a portion of interest by means of a symbolic name, such as but not limited to a program construct such as a function, data structure, or any other construct supported by the computer language being used for the project being controlled by RCS 80.

Receiving an indication of the portion of interest may include monitoring one or more sources of information that may indicate changes being made to the base source code by one or more members of the team of developers and determining whether one or more sources of information indicate that changes have been made to the portion of interest. Examples of sources of information may include log files 112 and 113 generated by RCS 80, email messages or mailing lists 114, online discussion boards 116, web pages, Wiki-based documents, social media mechanisms such as Twitter or Facebook, or other forums. In some embodiments, RCS 80 may include capabilities for selecting one or more information sources.

In an embodiment, an information source may be one or more log files 112, which are generated during a check-in or merge operation to memorialize changes committed to a given source file 90. For example, a log file 112 for source file 90*a* may record data such as but not limited to an associated developer ID, date-stamp, and developer-written comments explaining changes. Separate log files 112 may document atomic or accumulated changes affecting the associated source file 90. If a portion of interest is a given source file 90*a*, a log file 112 corresponding to file 90*a* might contain information of use to developer 74*a* who has checked out file 90*a*. Other files 112 may also contain information such as developer comments useful to developer 74*a*. In an embodiment, RCS 80 may offer a mechanism for defining a set of log files 112 as a source of information and for defining patterns to match within the selected set of log files 112. RCS 80 may offer a search syntax, such as that used for UNIX global regular expression parsing, to facilitate pattern matching within log files 112. In this embodiment, RCS 80 in effect enables a developer to automatically monitor project-wide records associated with ongoing check-in operations. When a match causes RCS 80 to send a notice 124 to a developer, RCS 80 may indicate the log file that triggered the match within the body of notice 124, for example by quoting it in full or in part or by including a link or pointer to a copy of the log file.

An information source may be one or more email mailing lists 114. To facilitate communication among members of team 72, team 72 may establish one or more lists 114, which may allow any member of team 72 to broadcast a message to other members of team 72 and to participate in project-related discussions. In an embodiment, RCS 80 may provide an integrated, internal email list feature. RCS 80 may alternatively or additionally provide features that allow it to act as a subscriber to an external list. Hosting or subscribing to one or more lists enables RCS 80 to gain access to the content of discussions on the lists and to maintain an archive of list traffic. Ongoing and/or archived discussions may contain comments applicable a particular development task. Specifying a list 114 as a source of information in effect allows a developer to automatically monitor present and past email list traffic for comments applicable to the current portions of interest. Email discussions are often conducted in ASCII text, which lends itself to electronic search techniques. RCS 80 accordingly may offer a search syntax to facilitate pattern matching within the selected list 114. When a match causes RCS 80 to send a notification 124 to a developer, RCS 80 may indicate the message that triggered the match within the body of notification 124, for example by quoting it in full or in part or by including a link or pointer to a copy of the message.

In an embodiment, an information source may be one or more online discussion forums 116. Forums 116 are similar to email lists 114 but implemented in a shared location with bulletin-board hosting software instead of email broadcast to a list. Team 72 may establish one or more forums 116 to facilitate project-related discussions. Especially for large projects, forums 116 may carry a high traffic volume. In embodiments, RCS 80 may offer features for hosting an internal forum 116, to act as subscriber to an external forum 116, or both. In embodiments, RCS 80 may offer a search syntax to facilitate pattern-matching within the content of a selected forum 116. RCS 80, by automatically monitoring forum 116 for the current portion of interest, may save considerable developer time otherwise spent reviewing forum 116. When a match causes RCS 80 to send a notification 124 to a developer, RCS 80 may indicate the message or thread that triggered the match within the body of notice 124, for example by quoting it in full or in part or by including a link or pointer to a copy of the message or thread.

In some embodiments, an information source 60 may be a defect tracker 118, also called a bug reporting system. A development environment often has a formal or informal bug-reporting system. Notifications that reference a defect tracker may incorporate relevant data such as a defect number or a description of the defect in question.

Determining whether at least one of the developers has made a change to a portion of a first copy of the base source code may include determining whether the portions of interest include common portions of the base source code. For example, if three developers check out the same source file from the base source code, RCS 80 may identify a portion of interest corresponding to changes occurring in each working copy. As each of the three developers modifies his or her respective working copy, RCS 80 correlates each set of changes to each working copy back to the underlying base source code, which is the canonical copy and the standard for determining that the code has changed. By reference to the base source code, RCS 80 may determine whether changes to two portions of interest impact a common portion of the base source code. For example, if two developers have edited the same line (when mapped back to the base source code), then both portions of interest include common portions.

In response to a determination that at one developer has made a change to a portion of interest, RCS 80 may produce a notification 124 of the change. RCS 80 accordingly may offer features for generating, addressing, and transmitting notifications. Examples of types of notification may include one or more of email messages, postings to one or more email lists, posting to one or more message boards, postings to one or more social media services such as Twitter, or any other communication mechanism or messaging technique known in the art and designated for announcements to members of the team individually or collectively.

The content of notification 124 may include any data associated with the pending change, portion of interest, or source of information. For example, if a first developer has checked out and changed a portion of the source code, and if a second developer has checked out and changed an overlapping portion of the source code, then the content of the notification to one developer individually may include the common file name, one or more line numbers, the source-code change implemented by the other developer, the name, email address, and/or phone number of the other developer, and other information detailing the pending change and potential merge conflict. In another example, if the event triggering the notification is the submission of a bug report through defect tracker 118, then the content of the notification 124 may include a defect number, a description of the defect, an indication of the association between the defect and the portion of interest, and/or other descriptive data.

The recipient of the notification may be one or more developers associated with the pending change, designated as recipients of the notification, or both. In an embodiment, RCS 80 may provide capabilities that automatically identify one or more recipients. For example, continuing the example of a first and second developer working on overlapping code, RCS 80 might identify the first developer as a primary recipient, since the first developer is presumably impacted by the overlapping change. From the perspective of the first developer, the notification is an early warning of a potential merge conflict, sent by RCS 80 before the first developer commits the change to the first working copy into the base source code. The notification enables the first developer to anticipate the merge conflict and avoid the task of manually resolving the merge conflict, which would otherwise be detected after the first developer commits the change.

RCS 80 may automatically identify further recipients. In the same example, the second developer might benefit from receiving a copy of the notification triggered by his or her own work. If the content of the notification identifies both developers, then they can potentially communicate about their overlapping work in progress, thereby coordinating their efforts and encouraging compatible changes.

RCS 80 may provide capabilities for registering an association between a developer or other team member and a notification address. For example, RCS 80 may provide a feature that allows each developer to designate one or more email addresses as a contact address for notifications.

RCS 80 may provide capabilities that allow a direct designation of one or more recipients of a notification. For example, it may be desirable to send notifications to project managers, documentation writers, or any other person or group identified by a contact address. RCS 80 accordingly may allow designation of one or more arbitrary contact address for receipt of notifications. RCS 80 may further allow filtering of notifications before determining the list of recipients, so that RCS 80 may direct different types of notifications to selected recipients.

The terminology used herein is for the purpose of describing particular embodiments only and is not intended to be limiting of the described inventions. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present inventions has been presented for purposes of illustration and description, but is not intended to be exhaustive or limited to the inventions in the form disclosed. For example, the invention may be embodied in an environment that is not part of a revision control system. Many modifications and variations will be apparent to those of ordinary skill in the art without departing from the scope and spirit of the inventions. The embodiments were chosen and described in order to best explain the principles of the inventions and the practical application, and to enable others of ordinary skill in the art to understand the inventions for various embodiments with various modifications as are suited to the particular use contemplated.

What is claimed is:

1. A method comprising:
identifying, by a computer system responsive to an action of a first of a plurality of developers, a portion of interest to the first developer in revision-controlled base source code stored in a source-code repository, the base source code being developed by the plurality of developers;
monitoring, by the computer system, a source of information generated in response to changes to respective copies of the base source code made by any of the plurality of developers to determine whether the generated information indicates that any change has been made to the portion of interest by any of the plurality of developers; and
in response to a determination, from the monitoring of the source of information, that a second one of the plurality of developers has made a change to the portion of interest in a first copy of the base source code and has not yet committed the first copy to the source-code repository, producing a notification of a potential merge conflict due to the change to the portion of interest and providing the notification for the first developer, wherein the action of the first developer comprises the first developer annotating a second copy of the base source code with delimiters that mark a beginning and an end of the portion of interest and adding, to the second copy of the base source code, content to the included in the notification.

2. The method of claim 1, wherein the action of the first developer further comprises the first developer checking out, from the source-code repository, the second copy of the base source code.

3. The method of claim 2, wherein:
the computer system queries the first developer, during the checking out of the second copy, to annotate the portion of interest.

4. The method of claim 1, wherein:
the action of the first developer further comprises the first developer checking out, from the source-code repository, the second copy of the base source code and then making a change to the second copy; and
the annotating designates, as the portion of interest, code where the change is made within the second copy.

5. The method of claim 1, wherein:
the action of the first developer further comprises the first developer checking out, from the source-code repository, the second copy of the base source code and then making a change to the second copy; and
the annotating designates, as the portion of interest, code included within a predetermined proximity of where the change is made within the second copy.

6. The method of claim 1, wherein the monitoring further comprises:
programmatically comparing, to a pattern describing the portion of interest, at least one of email messages exchanged among ones of the plurality of developers and forum discussions created by ones of the plurality of developers; and
determining that the second developer has made the change to the portion of interest if a match is found by the programmatically comparing to the pattern.

7. The method of claim 1, wherein the action comprises the first developer specifying placement of the delimiters through a user interface of the computer system.

8. The method of claim 1, wherein:
the second copy of the base source code has been checked out from the source-code repository by the first developer; and
further comprising:
responsive to the computer system detecting that the first developer has checked the second copy back in to the source-code repository, automatically removing delimiters.

9. A computer system, comprising:
a processor;
a memory; and
a program comprising a plurality of instructions stored in the memory that are executed by the processor to:
identify, responsive to an action of a first of a plurality of developers, a portion of interest to the first developer in revision-controlled base source code stored in a source-code repository, the base source code being developed by the plurality of developers;
monitor a source of information generated in response to changes to respective copies of the base source code made by any of the plurality of developers to determine whether the generated information indicates that any change has been made to the portion of interest by any of the plurality of developers;
and
in response to a determination, from the monitoring of the source of information, that a second one of the plurality of developers has made a change to the portion of interest in a first copy of the base source code and has not yet committed the first copy to the source-code repository, produce a notification of a potential merge conflict due to the change to the portion of interest and provide the notification for the first developer, wherein the action of the first developer comprises the first developer annotating a second copy of the base source code with delimiters that mark a beginning and an end of the portion of interest and adding, to the second copy of the base source code, content to be included in the notification.

10. The computer system of claim 9, wherein the source of information comprises at least one log file.

11. The computer system of claim 9, wherein:
the plurality of instructions further comprises instructions that are executed by the processor to record, for the source-code repository, information indicating that the second developer checked out the first copy of the base source code and that the first developer checked out the second copy of the base source code; and
the monitoring further comprises using the recorded information to determine, responsive to the action of the first developer, that development activity of the second developer is to be monitored to determine whether the second developer has made the change to the portion of interest.

12. A computer program product for pre-merge conflict avoidance, the computer program product comprising:
at least one non-transitory computer readable storage medium having computer readable program instructions embodied therewith, the computer readable program instructions, when read by a processor, being configured to:

identify, responsive to an action of a first of a plurality of developers, a portion of interest to the first developer in revision-controlled base source code stored in a source-code repository, the base source code being developed by the plurality of developers;

monitor a source of information generated in response to changes to respective copies of the base source code made by any of the plurality of developers to determine whether the generated information indicates that any change has been made to the portion of interest by any of the plurality of developers; and in response to a determination, from the monitoring of the source of information, that a second one of the plurality of developers has made a change to the portion of interest in a first copy of the base source code and has not yet committed the first copy to the source-code repository, produce a notification of a potential merge conflict due to the change to the portion of interest and provide the notification for the first developer, wherein the action of the first developer comprises the first developer annotating a second copy of the base source code with delimiters that mark a beginning and an end of the portion of interest and adding, to the second copy of the base source code, content to be included in the notification.

13. The computer program product of claim 12, wherein the computer readable program instructions, when read by the processor, are further configured to query the first developer to designate the portion of interest, and wherein the action comprises the first developer annotating with the delimiters, as the portion of interest, a particular variable referenced in the base source code.

14. The computer program product of claim 12, wherein the computer readable program instructions, when read by the processor, are further configured to query the first developer to designate the portion of interest, and wherein the action comprises the first developer annotating with the delimiters, as the portion of interest, a particular function referenced in the base source code.

15. The computer program product of claim 12, wherein:

at least one role is associated with each of the plurality of developers;

the instructions configured to the identify the portion of interest further comprise computer readable program instructions which, when read by the processor, are further configured to:

determine each of the at least one role which is associated with the first developer; and for each of the at least one determined role, associate the portion of interest with each of the plurality of developers for whom the each role is also associated with the each developer; and the instructions configured to produce the notification and provide the notification for the first developer further comprise computer readable program instructions which, when read by the processor, are further configured to provide the produced notification for each of the plurality of developers with whom the portion of interest is associated.

* * * * *